E. L. GERRISH.
COUPLING.
APPLICATION FILED AUG. 7, 1919.

1,348,277.

Patented Aug. 3, 1920.

INVENTOR.
Edward L. Gerrish
BY
ATTORNEY

UNITED STATES PATENT OFFICE.

EDWARD L. GERRISH, OF ELK GROVE, CALIFORNIA.

COUPLING.

1,348,277.  Specification of Letters Patent.  Patented Aug. 3, 1920.

Application filed August 7, 1919. Serial No. 315,835.

*To all whom it may concern:*

Be it known that I, EDWARD L. GERRISH, a citizen of the United States, residing at Elk Grove, in the county of Sacramento, State of California, have invented certain new and useful Improvements in Couplings; and I do declare the following to be a full, clear, and exact description of the same, reference being had to the accompanying drawings, and to the characters of reference marked thereon, which form a part of this specification.

This invention relates to improvements in couplings, and particularly to hose couplings, the principal object of the invention being to produce a coupling by means of which the hose end on which my coupling is attached may be coupled to either a male or female coupling on another length of hose, hydrant or nozzles, etc.

In other words, I have combined both a male and female coupling in one unit.

As at present constructed, the male member is secured to the end of one length of hose and the female member to another length, and the proper ends must be brought together before the hose can be coupled.

If two male or female ends should happen to be adjacent, the hose cannot be coupled which is a very disadvantageous feature, as for instance, in coupling up fire hose, where any slight delay may mean loss of life and property.

With my improved coupling, either the male or female end of a coupling of the present standard size may be connected thereto, provided of course they are of the same size and thread.

Also, any pair of my couplings may be connected to each other, provided they are of the same size and thread.

A further object of the invention is to produce a simple and inexpensive device and one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
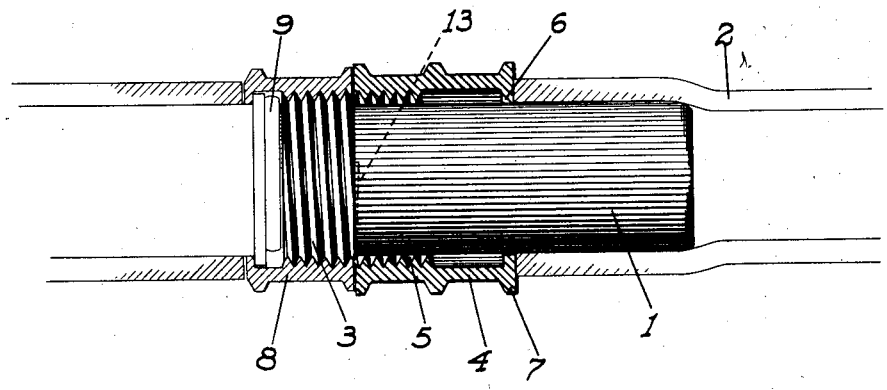
Figure 1 is a sectional elevation of my improved coupling, showing the same connected to the female member of a coupling of a standard type.
Figure 2:
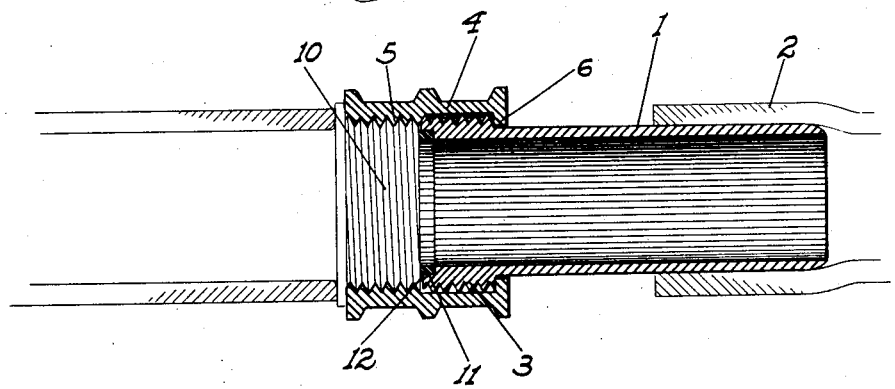
Fig. 2 is a sectional view showing my coupling connected to a male member.

Referring now more particularly to the characters of reference on the drawings, the numeral 1 denotes a tubular shank adapted to fit into or onto a hose 2, as in the case of fire hose. On the outer end of this shank is a threaded portion 3 of larger diameter than the shank.

Positioned over the member 1 for a certain portion of its length is a collar or sleeve 4 having a threaded portion 5 on the end thereof farthest from the hose 2, and adapted to engage the thread 3, and a flange 6 on the other end, the interior diameter of the sleeve in the space between the flange and the threaded portion being large enough to permit of its slipping over the threaded portion 3 on the member 1.

The outer surface of the member 4 is ribbed as at 7, the edges of the ribs being knurled to provide a firm finger grip, or in larger sizes may be provided with spanner lugs.

If it is desired to connect my improved coupling to the female member 8 of any other coupling, the sleeve 4 is screwed off the portion 3 of the member 1 and rests between the same and the holes 2. This leaves the threaded portion 3 bare and free to be received into the member 8, there being of course the usual washer 9 seated in such member 8.

If it is desired to connect my coupling to the male member 10 of any other standard type, the sleeve 4 is unscrewed from the threads 3, but in the outward direction, so that the flange 6 abuts against the threaded portion 5 on the sleeve 4 free for the screwing thereof onto the member 10.

The outer end of the member 1 is recessed or countersunk as at 11 for the insertion of a rubber washer 12 therein which projects from the recess and abuts against the member 10 to form a water tight joint.

Figure 3:
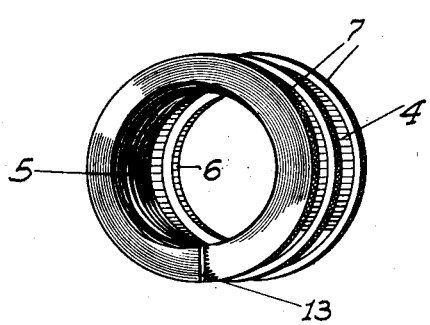
Fig. 3 is a perspective view of the collar or sleeve of my coupling, showing a notch to prevent possible jamming when used in connection with another of my improved couplings.

In Fig. 3 is shown a notch 13 of ratchet form cut in the outer edge of the member 4, so that when a pair of my improved couplings are connected together the corresponding notches in the members 4 will engage each other and prevent any possibility of the two jamming together, as one member 4 will be positively caused to turn and back off the threads 3 as the other member 4 advances.

From the foregoing description it will be readily seen that I have produced such a device as substantially fulfill the object of the invention as set forth herein.

While this specification sets forth in detail the present and preferred construction of the device, still in practice such deviation from such detail may be resorted to as does not form a departure from the spirit of the invention, as defined by the appended claims.

Having thus described my invention what I claim as new and useful and desire to secure by Letters Patent is:

1. A hose coupling comprising a tubular sleeve adapted to be connected to the end of a hose, a threaded portion on the outer end of the sleeve of larger diameter than the same, and a collar on the sleeve threaded for a portion of its length, the collar being adapted for movement on the sleeve from behind the threaded portion thereof to a point where the threaded portion of the collar will project beyond the outer end of the sleeve.

2. A hose coupling comprising a tubular sleeve adapted to be connected to the end of a hose, a threaded portion on the outer end of the sleeve of larger diameter than the same, a collar on the sleeve threaded in its outer end for engagement with the threads of the sleeve, and a flange on the other end of the collar adapted to slide on the sleeve and abut against the threaded portion of the sleeve when the threaded portion of the collar is unscrewed from the sleeve to project therebeyond.

3. A hose coupling comprising a tubular sleeve adapted to be connected to the end of a hose, a threaded portion on the outer end of the sleeve of larger diameter than the same, a collar on the sleeve threaded for a portion of its length, the collar being adapted to be positioned on the sleeve behind the threaded portion thereof, or to have its threaded portion project beyond the outer end of the sleeve, and a ratchet notch cut in the outer end of the collar whereby when connecting two such couplings together, the advancing collar on one sleeve will positively cause the collar on the other sleeve to retract on the threads thereof.

In testimony whereof I affix my signature in presence of a witness.

EDWARD L. GERRISH.

Witness:
 VERADINE WARNER.